Sept. 11, 1951        A. VAN RYAN        2,567,411

POLYPHASE CIRCUIT INTERRUPTER

Filed Jan. 5, 1946        6 Sheets-Sheet 2

INVENTOR.
ANTHONY VAN RYAN
BY
ATTORNEY.

Sept. 11, 1951　　　A. VAN RYAN　　　2,567,411
POLYPHASE CIRCUIT INTERRUPTER
Filed Jan. 5, 1946　　　6 Sheets-Sheet 3

INVENTOR.
ANTHONY VAN RYAN
BY
Arthur R. Woolfolk
ATTORNEY.

Fig. 5

Sept. 11, 1951     A. VAN RYAN     2,567,411
POLYPHASE CIRCUIT INTERRUPTER
Filed Jan. 5, 1946     6 Sheets-Sheet 6

INVENTOR.
ANTHONY VAN RYAN
BY
Arthur R. Woolfolk
ATTORNEY.

Patented Sept. 11, 1951

2,567,411

UNITED STATES PATENT OFFICE 2,567,411

POLYPHASE CIRCUIT INTERRUPTER

Anthony Van Ryan, South Milwaukee, Wis., assignor to McGraw Electric Company, a corporation of Delaware Application January 5, 1946, Serial No. 639,358

4 Claims. (Cl. 200—89)

This invention relates to a polyphase automatic reclosing circuit interrupter and to a system of distribution.

It has been found that most faults or shorts on distribution systems are of a temporary nature and that approximately eighty five per cent of these cases will permit immediate restoration of service after the fault is once cleared. Also, at least half of the remaining fifteen per cent of the cases will permit restoration of the service if the fault is cleared a second time, the remaining seven and one half per cent of the faults usually are of a permanent nature.

Objects of this invention are to provide a polyphase circuit interrupter which is so made that operating means are provided in each phase and are each arranged to have one or more quick circuit interrupting operations followed by one or more slow circuit interrupting operations provided the overload continues and which, therefore, is so constructed that it has in reality two time current characteristics and may be coordinated with fuses in branch lines following the circuit interrupter.

Further objects are to provide a polyphase system of distribution in which a polyphase circuit interrupter having the characteristics hereinabove enumerated is placed at each of the more important sectionalizing points and is followed by fuses or other circuit interrupting devices, the circuit interrupter being coordinated with the following devices to insure the operation of the proper device for a temporary or a permanent fault.

Further objects are to provide a polyphase circuit interrupter in which each of the operating units in each of the phases has hydraulic means for securing the two time current characteristics and has hydraulic time delay means for delaying its closing motion and which has lock-out means which will cause opening of all of the phases and the lock-out of the circuit interrupter and which also is provided with manual means whereby it may be tripped to lock-out all phases and may be manually reset and which also is arranged for automatic operation even though the manual means may be in motion towards the resetting position.

Further objects are to provide a polyphase circuit interrupter in which each of the operating means in each of the phases has cumulative hydraulic means for causing automatic lock-out of all phases of the circuit interrupter after a predetermined number of operation of any given unit occurring in rapid succession and which is so arranged that if these operations occur at widely spaced intervals, means are provided for automatically resetting that particular operating means for its full number of subsequent operations.

Further objects are to porvide a polyphase circuit interrupter which, if desired, may be readily changed so that all of the operations of the circuit interrupter may be either rapid or retarded.

In greater detail, further objects are to provide a polyphase circuit interrupter in which the counting or cumulative hydraulic means of each of the operating units is entirely independent of that of each of the remaining operating units so that the total number of operations at which lock-out occurs must take place in some one given unit before lock-out occurs.

Further objects are to provide a polyphase circuit interrupter which is so arranged that it will open only one phase for a temporary fault on that phase and open all of the phases for a permanent fault after a plurality of operations of one of the operating units in the event that a fault occurs between the circuit interrupter and the succeeding protective device.

An embodiment of the invention is shown in the accompanying drawings, in which.

The polyphase circuit interrupter chosen for illustration is a three phase circuit interrupter. It is housed within a metal tank 1 whose major portion is lined with fiber. It is preferable to provide three sections of fiber lining, each of rectangular construction and indicated by the reference character 2 so as to separate the major portion of the tank into three compartments in which the three operating units are located. All portions of the circuit interrupter are carried by or suspended from the cover 3, which cover is clamped to the tank body by means of bolts 4, see Figure 3. Yielding gasket means 5 is interposed between the upper edge of the tank and the lower portion of the cover. The tank is filled with oil to approximately the level indicated by the reference character 6 so that the major portion of the operating parts of the circuit interrupter are oil immersed.

Figure 1:
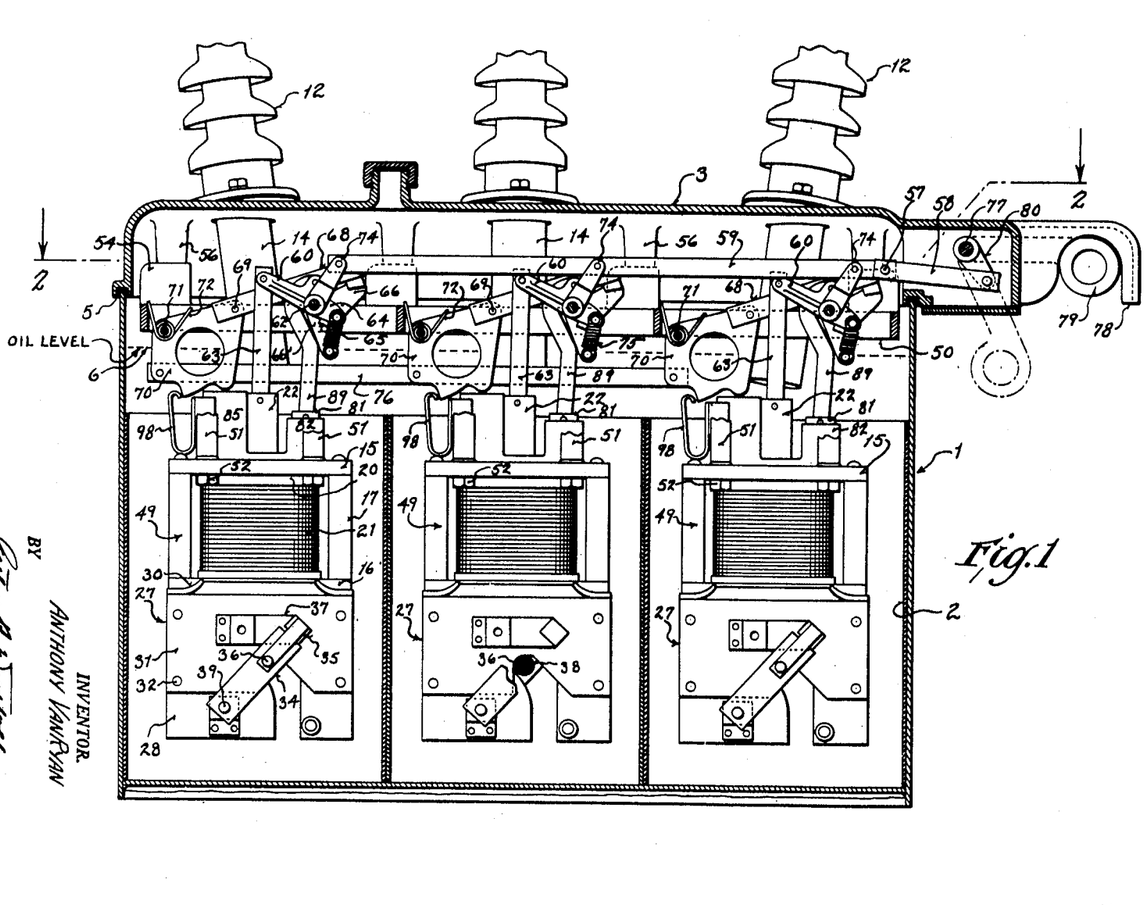
Figure 1 is a sectional elevation of the polyphase circuit breaker with parts broken away and parts in section, such view corresponding to a section on the line 1—1 of Figure 2.
Figure 2:
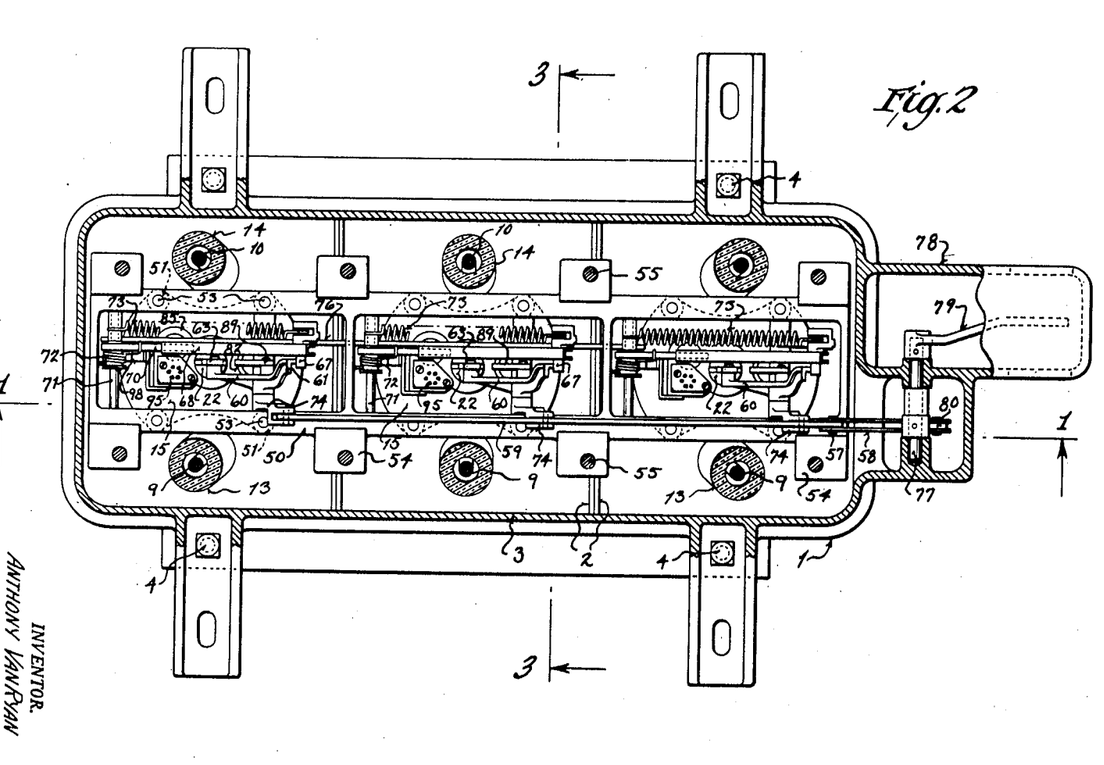
Figure 2 is a sectional view on the line 2—2 of Figure 1.
Figures 3, 8:
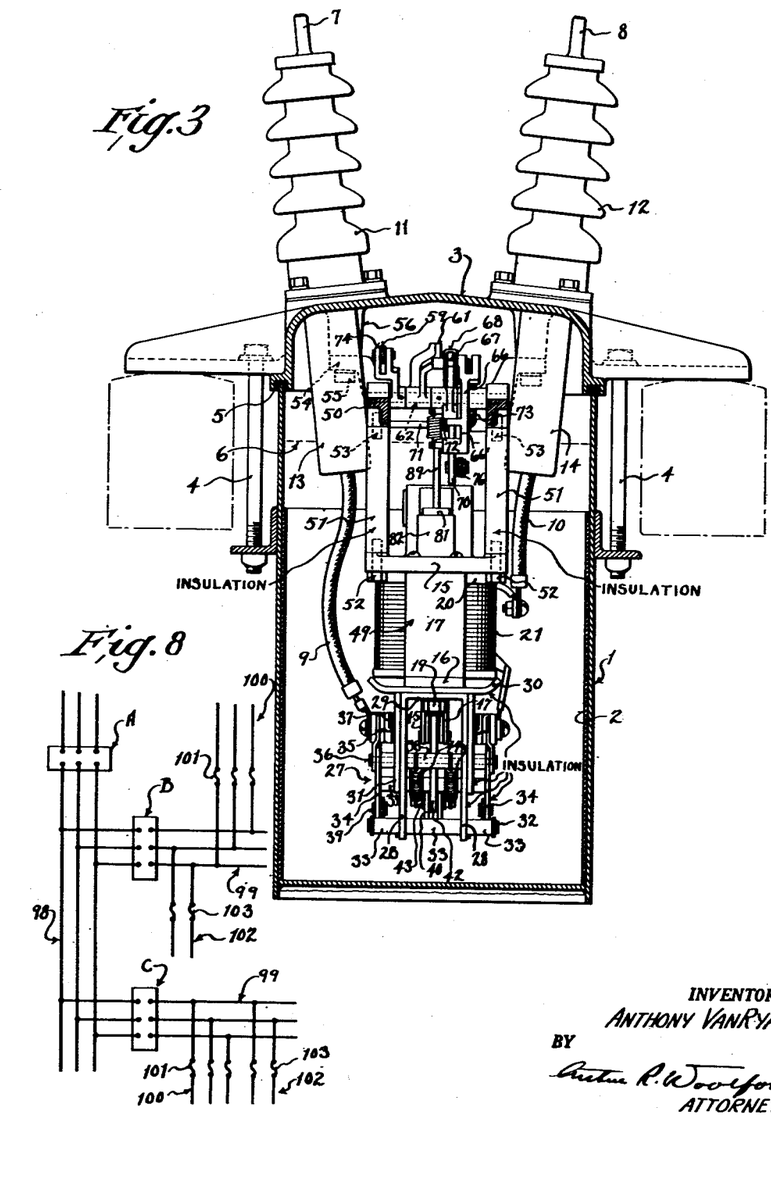
Figure 3 is a sectional view on the line 3—3 of Figure 2.
Figure 8 is a diagrammatic view of a system in which the circuit interrupters are employed.

The line and load terminals are indicated by the reference characters 7 and 8 in Figure 3, and it will be noted from reference to Figures 1 and 2 that there are three line terminals and three load terminals located on opposite sides at the top of the circuit breaker. The terminals are connected by means of insulated conductors 9 and 10 with the appropriate parts of the circuit breaker as will appear hereinafter. Suitable insulating bushings 11 and 12 are mounted on the upper portion of the tank and carry the terminals 7 and 8 respectively. These bushings have extensions 13 and 14 which project downwardly into the tank below the oil level in accordance with the usual practice.

Figure 4:
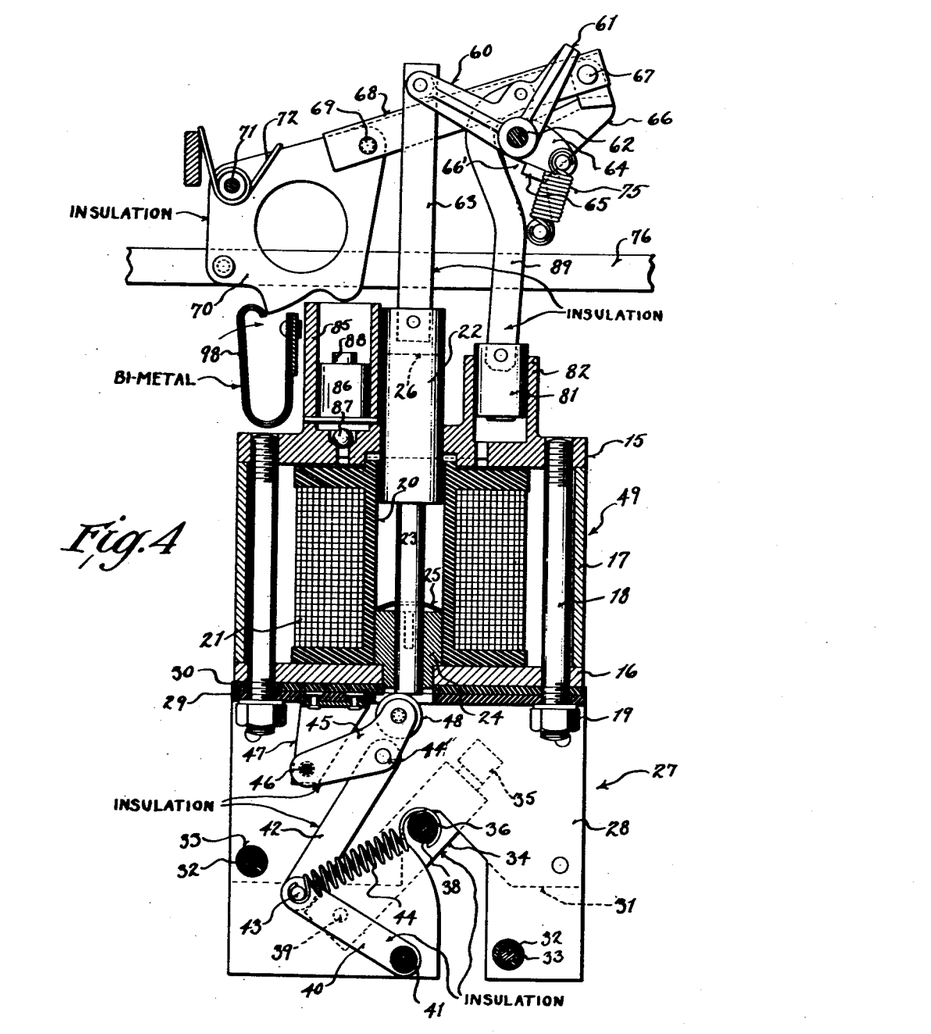
Figure 4 is a sectional view through one of the operating units, such view showing the switch controlled by that particular unit in closed position.
Figure 5:
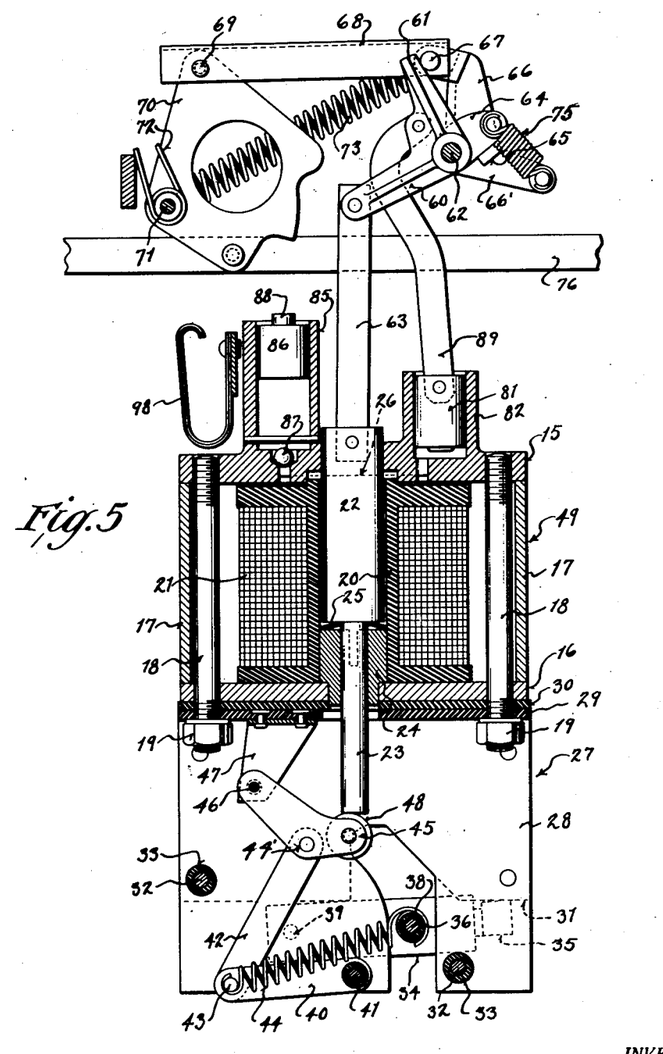
Figure 5 is a view corresponding to Figure 4 showing the switch of that unit in open position and showing the position of the parts when the circuit interrupter has been locked out.

In view of the fact that all of the operating units of the circuit interrupter are of identical construction, a description of one will be sufficient. Figures 4 and 5 show the central unit and referring to such figures it will be seen that each operating unit consists of a body portion of magnetic structure which is composed of a top magnet member 15 and a lower or bottom magnet member 16 separated by magnetic spacers 17 and held in clamped position against such spacers by means of bolts 18 threaded into the member 15 and carrying nuts 19 at their lower ends. Between the upper and lower magnet members 15 and 16, a cylinder or tube 20 of insulating material is positioned and is provided with upper and lower flanges as shown in the drawings. A solenoid or magnet coil 21 is wound on the cylinder and is arranged to draw a magnetic plunger 22 downwardly from the position shown in Figure 4 to that shown in Figure 5. This magnet plunger is provided with a nonmagnetic extension 23 which projects through a magnetic plug or member 24 carried by the lower magnet member 16. If desired, this plug may be slotted as shown in Figures 4 and 5 to lessen the eddy current. Also a spring washer 25 may be provided immediately above the plug 24 to act somewhat as a cushioning member for the plunger 22. The upper portion of the plunger is slotted downwardly to the point indicated by the reference character 26.

When the plunger is drawn downwardly into the tube or cylinder 20, it displaces oil from beneath the plunger and this oil escapes in a manner hereinafter to appear. It is to be noted that the plunger travels at an increasingly rapid rate as the lower portion of the stroke is approached and the slotted upper portion of the plunger allows sudden discharge of the displaced oil and, therefore, permits the plunger to have a very quick final stroke.

The details of the time delay for the plunger and the control of the escaping oil will be described hereinafter.

Each switch assembly is a unit and is indicated generally by the reference character 27 in Figures 4 and 5, and all of the switch assemblies are identical. Each switch assembly is adapted to be applied to and removed from the body portion as a unitary structure, and consists of a pair of insulating side walls 28 which have a transverse upper portion 29 bolted to the lower part of the body portion of the unit as shown in Figures 4 and 5. If desired, an insulating plate 30 may be interposed between the bottom magnetic member 16 and the transverse portion 29. Also, if desired, reinforcing insulating plates 31, see Figure 3, may be positioned on opposite sides of the insulating plates 28. The side walls or plates 28 are joined by means of rivets 32 which are surrounded by insulating sleeves 33. One of these rivets projects outwardly beyond the side walls and is provided with additional sleeves 33 which constitute stops for the insulating arms 34 of the switch when the switch is in open position as shown in Figure 5.

A detailed description of one of the switch assemblies will be given although such switch assembly is described in greater detail in the copending application of Anthony Van Ryan and Carl Schindler, Serial No. 527,724, filed March 23, 1944, now Patent No. 2,560,529, July 10, 1951, for Automatic Reclosing Circuit Breakers.

Referring to Figures 4 and 5 where an individual switch assembly has been shown in closed and open positions respectively, it will be seen that the insulating arms 34 constitute in effect the switch arms as they carry the movable contacts 35 which are electrically connected to each other by means of the conducting pin 36. These movable contacts 35 are adapted to engage stationary contacts 37, see Figure 1, located on the outer side of the insulating walls 28 of the switch assembly. The pins 36 are surrounded by insulating sleeves 38 and the arms 34 are pivoted as indicated at 39. A guiding lever 40 is pivoted as indicated at 41 and is composed of a pair of insulating members between which a link 42 is pivoted by means of a pin as indicated at 43. A pair of tension springs 44 are interposed between the sleeve 36 and the pin 43 and thus serve to operatively connect the free or outer end of the rocking lever 40 and the switch arms 34, the lever 40 acting as a guiding means for one end of the springs 44. The link 42 is formed of insulating material and is pivoted at its upper end as indicated at 44' to an insulating lever 45 composed of a pair of insulating members pivoted as indicated at 46 upon downwardly projecting arms of a bracket 47 rigidly secured to the transverse upper portion 29 of the insulating side walls 28. The lever 45 carries a hardened steel roller 48 which is adapted to be engaged by the projecting portion 23 of the plunger 22.

The operation of the switch is as follows: Assume that an overload occurs and the plunger 22 travels downwardly. The projecting portion 23 which engages the roller 48 will push the roller downwardly. This, in turn, rocks the lever 40 about its pivot point 41 and carries the left-hand end of the tension springs 44 past the pivot point 39 of the switch arms and causes a quick opening stroke of the switch. In addition to this, the parts are so proportioned that the roller 48 strikes the insulating sleeve 38 supported from the switch arms 34 just as the springs 44 are passing the pivot point 39 and thus a sharp blow is imparted to the switch to assist in an initial opening of the switch, the springs 44 completing the quick opening stroke.

It is to be noted that when the switch is in open position, as shown in Figure 5, that the line of pull of the springs 44 is above the pivot point 41 of the lever 40 and consequently such springs 44 serve the additional purpose of urging the magnetic plunger 22 upwardly as the springs tend to rotate the lever 40 in a clockwise direction and motion is imparted to the lever 45 through the link 42 and consequently the plunger 22 is urged towards open position.

It will be seen further that when the plunger travels upwardly under the influence of the springs 44, as described hereinafter, that the line of pull of the springs 44 crosses the dead center or pivot point 39 of the switch arms 34 and consequently causes the switch to close with a quick motion. The springs 44, therefore, act also as means for raising the plunger as well as the means for opening and closing the switch.

From the description thus far given, it will be seen that the switch assembly, indicated generally by the reference character 27, is supported from its corresponding magnetic operating unit, which latter is indicated generally by the reference character 49 and which has been described in detail hereinbefore. In turn, each magnetic unit 49 is supported from a horizontal open frame 50, see Figures 1 and 2. The magnetic units are supported in any suitable manner, preferably by means of a plurality of insulating pillars 51 whose lower ends receive screws 52, see Figure 3, passing through the upper yoke 15 of the magnet assembly and whose upper end is secured to the under side of each of the side bars of the frame 50 by means of threaded pins as indicated generally at 53 in Figure 3. It will be seen, therefore, that the pillars 51 constitute an insulating support which is interposed between each of the magnet and switch assemblies and the supporting main frame 50.

This supporting main frame 50 is shown in Figures 1, 2, and 3, and is generally of rectangular contour. It is provided with a plurality of lugs 54 which are secured by means of bolts 55 to bosses 56 extending downwardly from the cover or top portion 3 of the casing, see Figure 3.

Thus it is clear that when the cover is removed the entire mechanism may be lifted from the tank. In addition to this, it is also apparent that if desired all three units of the circuit breaker may be readily detached from the cover by detaching the main frame 50 from the cover.

Thus it is clear, first, that all three units may be removed from the tank by merely removing the cover; second, the main frame 50 and all of the switch assemblies and magnetic operating units can be removed as a single assembly from the cover; third, each magnetic operating unit and its switch assembly may be individually removed from the main frame; fourth, each individual switch assembly may be removed from its corresponding magnetic unit; and, fifth, each magnetic unit may be separately removed. The leads 9 and 10, see Figure 3, are removably connected respectively to one of the stationary contacts of the switch assembly and to one side of the magnet coil 21, to facilitate removal or replacement of the parts.

Each unit of the circuit interrupter is provided with a bell crank lever having arms 60 and 61 as shown most clearly in Figures 4 and 5. This bell crank lever is in each instance loosely mounted on a transverse shaft 62 journaled in the main frame 50, the main frame 50 having been omitted for the sake of clearness in Figures 4 and 5 and being shown in Figures 1, 2, and 3. The arm 60 is connected to the magnetic plunger 22 by means of a link 63 formed of insulating material. A small lever 64 is rigidly mounted on the shaft 62 and is normally held in contact with a lug 65 integral with the arm 66' of a second bell crank lever loosely mounted on the shaft 62. The other arm 66 of the last mentioned bell crank lever extends upwardly and is provided with a pin 67 to which is pivoted a downwardly opening channel-shaped link 68. The other end of the link 68 is pivoted as indicated at 69 to a trip member 70 formed of insulating material pivotally supported from the main frame as indicated at 71. A spring 72 urges the tripping member 70 in a clockwise direction. Under normal conditions the members 70 and 68 form a toggle link mechanism which, as will be seen from Figure 4, in its normal position is slightly below dead center and, therefore, locked against motion as the end of the channel-shaped link 68 extends slightly beyond the pin 69 and engages the top of the member 70. The toggle is urged towards collapsing motion by means of a relatively heavy tension spring 73, see particularly Figure 5. This tension spring extends between the pin 67 and the pin 71 but is normally ineffective to collapse the toggle link mechanism until the toggle link is forced past dead center in a manner hereinafter described.

It is to be noted that the shafts 62 of each of the units which rigidly carries the lever 64 also rigidly carries a small upwardly projecting arm or lever 74, see Figures 1 and 2. Each of the levers 74 is connected by means of a rock bar 59 so that motion of all of the levers 74 occurs simultaneously whether they are automatically or manually operated in a manner hereinafter described.

It is to be noted also from reference to Figure 1 that a lower rock bar 76 is provided and connects all of the trip members 70 so that all of the trip members 70 operate simultaneously. The rock bar 76 is preferably formed of insulating material.

It will be seen from Figures 1 and 2 that a shaft 77 is journaled in the top or cover 3 and that the top or cover 3 is provided with an extension 78 which constitutes a downwardly opening housing. The housing 78 normally houses an eyeleted manipulating and indicating member 79. The member 79, as will be seen hereinafter, moves to an exposed or downward position as shown in dotted lines in Figure 1 upon automatic lock-out or manual opening of the circuit breaker. This arm 79 is also employed to simultaneously reset all of the circuit breakers in a manner hereinafter described. The shaft 77 rigidly carries a small lever 80 located within the cover 3 which is connected by means of the link 58 with the upper rock bar 59. This upper rock bar constitutes means for resetting all units of the circuit breaker and also constitutes means for manually tripping all units of the circuit breaker.

The manual tripping of the circuit breaker will be apparent from the previous description for when the eyeleted handle 79 or manipulating member is pulled downwardly by means of a switch stick, the upper rock bar 59 is moved to the left as viewed in Figure 1 and consequently through the medium of the arms 74 rocks the small arms 64 upwardly against the action of their springs 75. The springs 75 merely serve to hold the small levers 64 in contact with the corresponding lugs 65. As these small levers 64 rock upwardly they engage the lower surface of each of the links 68 and break the toggle for each unit. The spring 73, see Figure 5, for each unit causes quick collapse of the toggle and the projecting pin 67 engages the lever 61 of each of the bell crank levers 60, 61, see Figure 5, and suddenly thrusts the plungers of all of the units downwardly, thus quickly opening each switch unit of the circuit breaker.

Cumulative hydraulic means are provided for automatically tripping all of the circuit breakers when any one or a plurality of the individual units of the circuit breaker has executed a plurality of opeartions in rapid sequence. This automatic tripping means will now be described for a single one of the units as all of the units have identical tripping means. This tripping means constitutes an automatic lock out means for all of the units of the circuit breaker. This mechanism consists of a pumping piston 81 operating in a pumping cylinder 82. The piston 81 is provided with a check valve 83, see Figure 7, which allows oil to enter on the up-stroke of the piston. The lower portion of the pumping cylinder 82 connects by means of a channel 84 with the lower portion of a counting cylinder 85 within which a counting piston 86 is slidably positioned. An upwardly opening check valve 87 is interposed between the passage 84 and the counting cylinder 85. The counting piston 86 is provided with a weighted valve 88 to allow a slow resettling of the counting piston. The weight of the valve 88 and the size of its upper portion as well as the clearance and size of its lower extension is such that during the sudden down stroke of the pumping piston 81 the clearance between the reduced downward extension of the valve 88 and the hole through the piston will act to restrict the flow of oil for the brief interval of the pumping stroke of the piston 81 and the pressure built up below the piston 86 will act primarily on the reduced extension of the valve 88 so far as the valve 88 is concerned, but will act also against the entire under side of the piston 86 while the piston is being raised. However, during resettling, oil pressure, in spite of the restriction hereinabove mentioned, slowly builds up beneath the part of the enlarged valve 88 and raises the valve with reference to the piston 86 and allows the piston to slowly settle. The piston 81 is operated by means of an insulating link 89 which connects the piston with the bell crank lever 60, 61, see Figure 4, so that the piston 81 operates once for each down stroke of the plunger 22. The heighth to which the piston 86 will rise for each stroke of the piston 81 is determined by the relative sizes of the pumping and counting cylinders 82 and 85.

It is apparent from the description thus far given that when the piston 86 has arrived at a predetermined point the upper end thereof, that is to say the upper end of the weighted valve 88, will strike the tripping member 70, see Figures 4 and 5, and will break the toggle, formed of the members 68 and 70, and will cause the circuit interrupter to remain in its open position and will lock the circuit interrupter in open position due to the action of the relatively powerful spring 73, see Figure 5.

The tripping and lock-out action of any one of the units of the circuit breaker causes simultaneous tripping and lock-out action of all of the units for it will be seen from Figure 1 that the tripping members 70 are connected by the lower trip bar 76 and thus all of the tripping members 70 operate simultaneously to trip the several units of the circuit breaker by breaking the toggle as the pivot point 69 of each unit, see Figure 5 is rocked upwardly past dead center and the spring 73 for each of the units is now effective to collapse the toggle link mechanism thus opening all of the units of the circuit breaker with a quick motion and locking all units in open position.

It is to be noted also from Figure 1 that when the levers 74 rock to the left as viewed in such figure, that the upper rock bar 59 is moved to the left and consequently causes the handle or member 79 to be moved to the indicating position as shown in dot and dash lines in Figure 1.

The several units of the circuit breaker may all be simultaneously reset by means of a switch stick inserted in the handle 79. The handle 79 is pushed upwardly from its dot and dash position to its full line position shown in Figure 1, and thus moves the rock bar 59 to the right as viewed in Figure 1. This motion is transmitted to each of the levers 74 and thus rocks each of the levers 64 to the position shown in Figure 4. The levers 64 engage the lugs 65 and rock the bell crank levers 66, 66' to a position to straighten out the toggle link mechanisms composed of the members 68 and 70. The springs 72 will rock the tripping members 70 clockwise slightly past dead center and thus each of the circuit breakers will again be put into its operative position.

It is also to be seen from Figures 1, 4, and 5 that when the manipulating member or handle 79 is pulled downwardly by means of a switch stick that the rock bar 59 is moved to the left as viewed in Figure 1 and through the medium of the levers 74 rocks each of the small levers 64, see Figure 4, upwardly into engagement with the lower side of the channel links 68, thus breaking each of the toggle link mechanisms and causing quick opening of each of the units of the circuit breaker.

Figure 7:
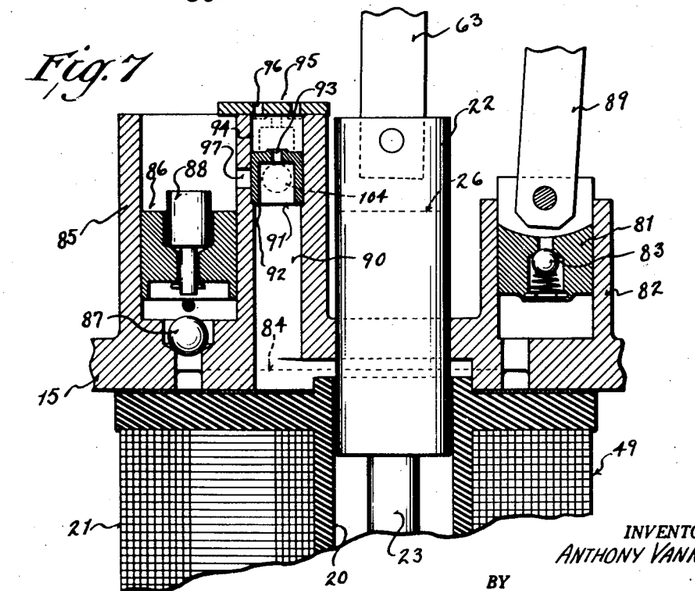
Figure 7 is a sectional view on the line 7—7 of Figure 6.

It is to be noted that the plunger 22 of each unit acts as a piston within the tube or cylinder 20 and on the down stroke of the plunger 22 pumps a certain amount of oil upwardly around the piston into the passage 90, see Figure 7. There is considerable clearance between the plunger 22 and the cylinder or tube 20 so that the oil freely passes out of this space into the passage 90. A light weight slide valve 91 is provided which normally rests on the shouldered portion 92. It is provided with a small aperture 93 in its upper portion. The slide valve 91 constitutes in effect a small piston which operates within the cylinder or passage 94, such cylinder 94 constituting an extension of the passageway 90. The upper end of the cylinder 94 is closed by means of a plate 95 provided with apertures 96. It is to be noted that a discharge aperture 97 is provided between the cylinder 94 and the counting cylinder 85 and that the upper end of the counting cylinder is open.

It is apparent, therefore, that when the plunger 22 is drawn downwardly on overload, that oil displaced by the plunger 22 raises the slide valve 91 upwardly and discharges through the discharge passage or outlet 97. At the same time the pump 81 operates and raises the counting piston 86 a predetermined amount. It is intended in the form of invention chosen for illustration that the plunger 22 shall make two quick strokes before the counting piston 86 closes the discharge aperture 97. When the counting piston 86 closes the discharge aperture 97 the plunger 22 is delayed on its subsequent down stroke or down strokes as the oil displaced by the plunger 22 has to pass upwardly leaking around the piston where it passes through the upper magnetic member 15 as the opening 97 is closed and as the slide valve 91 closes its opening 93 when it is at the top of its stroke. The slide valve is driven to the top of its stroke on the initial portion of the down stroke of the plunger 22. Consequently, after two operations of the circuit interrupter the downward stroke of the piston or plunger 22 will be retarded and a delayed opening of the circuit interrupter will result. The construction is such in the form of invention chosen for illustration that the plunger 22 will make two slow down strokes before the piston 86 will trip the trip lever member 70. The construction is such that on the last stroke of the plunger 22 the valve 88 of the counting piston 86 will engage the lower portion of the tripping member 70 and will prevent any escape of fluid through the counting piston 86 thus causing a powerful thrust to be imparted to the tripping member 70.

The aperture 93 of the slide valve 91 constitutes a restricted opening through which oil may flow during the upward travel of the plunger 22. This causes a delayed closing of the circuit interrupter after each circuit interrupting operation.

It is to be understood that when the pumping piston 81 no longer furnishes oil to the counting piston 86 that the counting piston 86 slowly settles downwardly and the oil below such piston slowly leaks past the weighted valve 88. This resetting of the counting piston has a dual function. In the first place after lock out occurs, the counting piston will reset itself so that no thought is required on the part of the operator when he manually resets the interrupter. The slow settling of the counting piston 86 has an additional purpose. The circuit interrupter locks out on its fourth operation when such operations occur in rapid sequence. If on the other hand a lesser number than four operations had occurred, the counting piston would slowly settle downwardly and would reset itself by arriving at its lowest position so that it would require the full predetermined number of operations before lock out would occur for subsequent operations.

It is to be distinctly understood that the design or proportion of the parts may be such as to have any desired number of quick operations followed by any number of slow operations.

Figure 6:
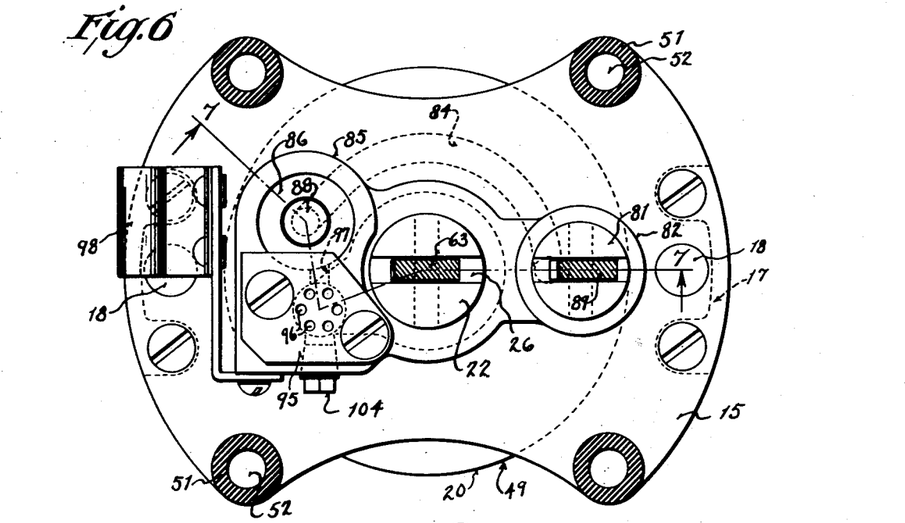
Figure 6 is a sectional view on the line 6—6 of Figure 4.

If desired bimetal thermostatic members 98 may be provided, see Figures 4, 5, and 6, which are adapted to trip the members 70 when the oil within the circuit interrupter arrives at a predetermined temperature.

It is to be noted that the circuit interrupter is trip free, for even during manual resetting it is free to operate. For instance, during manual resetting the small lever 64 is rocked from the position shown in Figure 5 to that shown in Figure 4 and rocks the bell crank lever 66, 66' in a clockwise direction. This merely moves the pin 67 away from the arm 61 of the bell crank lever 60, 61 and allows the plunger 22 to rise. If, however, when the circuit interrupter closes, an overload still exists, the plunger 22 is free to make a quick down stroke and open the switch mechanism though the operator may still be in the process of resetting the circuit interrupter.

The above description is applicable to each of the several units of the circuit interrupter. It has been previously pointed out that when tripping action occurs for any unit of the circuit interrupter, tripping action simultaneously occurs for all units of the circuit interrupter.

It is to be noted from the description hereinbefore given that each of the individual units of the polyphase circuit interrupter has one or more quick circuit interrupting operations followed by one or more slow circuit interrupting operations provided the overload continues, but is so constructed that it will open all of the phases and lock out all of the phases when lock out action of any unit occurs.

It is to be understood that under all conditions the opening or closing of the switch element or switch elements of the circuit breakers occurs with a quick motion independent of the speed of travel of the plunger or plungers 22.

The individual units of the circuit breaker have two time current characteristics; one when the discharge passage 97, see Figure 7, is open, and the other when it is closed by the counting piston 86. When the discharge passage 97 is open the plunger 22 can execute a quick down stroke. When the discharge passage 97 is closed the plunger 22 is delayed in its downward travel and consequently a different time current characteristic is secured. This is highly desirable where the current interrupter is followed by fuses or other circuit interrupting means.

Figure 8 shows a system of distribution which also forms a part of this invention. Referring to Figure 8, A represents a repeating lock-out circuit interrupter which protects the main three phase line 98 and which may be of the same type as that hereinabove described or may be of a different type. This main line may have a plurality of three phase branch lines 99, which in turn may have other branch lines or sub-branch lines 100 protected by fuses or other circuit interrupting means 101. Also, single phase branch lines or sub-branch lines 102 protected by fuses 103 may lead from the three phase branch lines.

Assume that a fault occurs on one of the branch lines 100, for instance. The individual circuit interrupter of polyphase interrupters B or C for that branch line is arranged to open very quickly prior to the blowing of a fuse or fuses on the branch line. If the fault clears nothing further happens when the circuit interrupter closes, but if the fault persists the circuit interrupter will execute another quick opening stroke for the particular unit or units involved. On again reclosing, if the fault still persists the circuit interrupter will have a delayed opening for the particular unit or units involved and the fuse or fuses in the branch line or sub-branch line 100 will blow thus isolating the branch line 100 in its entirety or else isolating the particular phase if only one phase is involved.

If, on the other hand, a single phase line such as one of the lines 102 has a fault thereon, the particular unit or units of the circuit breaker controlling such line will operate as described hereinabove thus either allowing the single phase line to continue to function, if the fault quickly clears, or causing either one or both of the fuses 103 to blow and thus isolate the single phase line.

It is to be understood that the circuit interrupter has two time current characteristics and that the fuses 101 and 103 have a single time current characteristic which lies between the two time current characteristics of the circuit interrupter. Thus when a fault occurs, the circuit interrupter opens quickly for at least one operation and if the fault persists the circuit interrupter then operates under its second or delayed time current characteristic. The particular fuse protecting the line on which the overload occurs will then blow as its time current characteristic lies between the two time current characteristics of the circuit interrupter.

If either a single phase or three phase fault occurs on main line 98, either one or all individual interrupters of circuit interrupter A will operate to clear this fault and will reclose to restore service. Should either the single phase or three phase fault on main line 98 be permanent, circuit interrupter A will, after a predetermined number of operations, lock out thus isolating main line 98 and its branches from the remainder of the system.

It occasionally happens that a purchaser wishes to have a quick action for all operations of the circuit interrupter. This is readily obtained by merely removing the screw plug 104 for each unit, see Figures 6 and 7. When the plug is removed a permanently opened discharge passage for the oil displaced by the plunger 22 is provided for each unit and thus allows all opening operations of the circuit interrupter to be rapid. The cumulative hydraulic action of the lock out or tripping piston is not disturbed as it is operated by means of the pumping piston 81 independently of any displacement of oil by the plunger or piston 22. Consequently although the circuit interrupter may be adjusted as described above so that all opening operations are rapid, nevertheless, it still retains its lock out features.

It also sometimes happens that a purchaser wishes to have a delayed action for all operations of the circuit interrupter. This is readily accomplished by substituting for the slide valve 91 a longer slide valve which is of such length that it permanently closes the opening 97 and thus causes a delayed action for all operations of the circuit interrupter. This, however, does not in any way affect the cumulative hydraulic action of the lock out or tripping piston for, as pointed out above, such lock out or tripping piston is operated by means of the pumping piston 81 independently of any displacement of oil by the plunger or piston 22.

It will be seen that the circuit interrupter provided by this invention has circuit interrupting means in each phase of the polyphase line and that these circuit interrupting means or units may selectively interrupt any one of the phases or may interrupt all of the phases.

It will be seen further that a three phase circuit interrupter has been provided which has two time current characteristics and which may be readily coordinated with fuses or other circuit interrupting devices in the distribution systems where these devices follow the circuit interrupter and protect either three phase or single phase branch lines or sub-branch lines.

It is to be noted that this invention provides a polyphase circuit interrupter in which a plurality of individual single phase interrupters are employed and in which each single phase interrupter is so arranged that it can have one or more quick interrupting operations followed by one or more slow or delayed interrupting operations independently of the operation of any other unit of the polyphase circuit interrupter. In addition to this, it is to be noted that although these circuit interrupters can operate independently, that nevertheless after a predetermined number of operations of any one of such independent single phase circuit interrupters has occurred, mechanism is arranged to cause simultaneous lock out of all of the individual single phase interrupters. In this connection also it is to be noted that resetting mechanism is provided which causes simultaneous resetting of all of the individual single phase interrupters constituting the polyphase interrupter.

Although this invention has been described in considerable detail it is to be understood that such description is intended as illustrative rather than limiting, as the invention may be variously embodied and is to be interpreted as claimed.

I claim:

1. A polyphase repeating circuit interrupter comprising a plurality of units, each unit having switch means and switch opening electromagnetic means responsive to overload independently of every other unit, said units being arranged for connection in the several phases of a polyphase systems, each unit having at least a relatively quick opening operation on overload and said switch means being biased closed, each unit having normally ineffective time delay means cooperating with said electromagnetic means to delay the opening of said switch means, means independent of said time delay means and coacting with said time delay means to render said time delay means effective to delay the opening of the corresponding switch means on continued overload after at least one quick operation of said unit, cumulative means for each unit, a normally inactive trip member for each unit moved by said cumulative means to lock the corresponding unit in open position, means interconnecting the trip members for simultaneously moving all of said trip members to lock-out position upon movement of any member to such position, and resetting means for simultaneously resetting all of said units, said means interconnecting the trip members being separate and distinct from said resetting means.

2. A polyphase repeating circuit interrupter comprising a plurality of single phase circuit interrupter units, each unit having switch means and switch opening means responsive to overload, said units being arranged for connection in the several phases of a polyphase system and being independently operable on overload in the corresponding phase, switch closing means for each unit, each unit having cumulative means responsive to a predetermined number of operations of the corresponding unit occurring in rapid sequence, each unit having normally ineffective lock out means and having trip means actuated by the cumulative means of the corresponding unit to render the lock out means effective when the said cumulative means has moved a predetermined distance, trip connecting means mechanically connecting each of said trip means to secure simultaneous movement of all of said trip means upon movement of any of said trip means, and manual means independent of said trip connecting means for selectively simultaneously resetting or tripping all of said units.

3. A polyphase repeating circuit interrupter comprising a plurality of single phase circuit interrupter units, each unit having switch means and switch opening means responsive to overload, said units being arranged for connection in the several phases of a polyphase system and being independently operable on overload in the corresponding phase, switch closing means for each unit, each unit having cumulative means responsive to a predetermined number of operations of the corresponding unit occurring in rapid sequence, each unit having normally ineffective lock out means and having trip means actuated by the cumulative means of the corresponding unit to render the lock out means effective when the said cumulative means has moved a predetermined distance, a common connecting trip bar mechanically connecting each trip means, whereby motion of one trip means is communicated to the remaining trip means, manually manipulable reset means, and a reset bar mechcanically connecting said manually manipulable means and each of said trip means, said reset bar and said trip bar being separate and independent elements.

4. A polyphase repeating circuit interrupter comprising a plurality of single phase circuit interrupter units, each unit having switch means and switch opening means responsive to overload, said units being arranged for connection in the several phases of a polyphase system and being independently operable on overload in the corresponding phase, switch closing means for each unit, each unit having cumulative means responsive to a predetermined number of operations of the corresponding unit occurring in rapid sequence, each unit having normally ineffective lock out means and having trip means actuated by the cumulative means of the corresponding unit to render the lock out means effective when the said cumulative means has moved a predetermined distance, a common connecting trip bar mechanically connecting each trip means, whereby motion of one trip means is communicated to the remaining trip means, manually manipulable reset means, and a reset bar mechanically connecting said manually manipulable means and each of said trip means and being separate and distinct from said trip bar, said lock out means coacting with said trip means whereby resetting of said trip means resets said lock out means.

ANTHONY VAN RYAN.

REFERENCES CITED

The following references are of record in the file of this patent:

UNITED STATES PATENTS

| Number | Name | Date |
|---|---|---|
| 508,652 | Thompson | Nov. 14, 1893 |
| 1,742,143 | Johnson, Jr. | Dec. 31, 1929 |
| 1,765,499 | Peterson | June 24, 1930 |
| 1,838,897 | Aalborg | Dec. 29, 1931 |
| 1,859,447 | Jansson | May 24, 1932 |
| 1,957,737 | Steinmayer | May 8, 1934 |
| 2,075,132 | Parsons et al. | Mar. 30, 1937 |
| 2,096,544 | Jackson | Oct. 19, 1937 |
| 2,102,284 | Sandin | Dec. 14, 1937 |
| 2,287,041 | Journeaux | June 23, 1942 |
| 2,333,604 | Wallace | Nov. 2, 1943 |
| 2,352,048 | Wallace | June 20, 1944 |
| 2,352,556 | Matthews | June 27, 1944 |
| 2,464,303 | Gesellschap | Mar. 15, 1949 |
| 2,476,076 | Walle et al. | July 12, 1949 |